US012039808B2

(12) United States Patent
Jung

(10) Patent No.: US 12,039,808 B2
(45) Date of Patent: Jul. 16, 2024

(54) ROOM MIRROR REMOVAL MONITORING DEVICE WITH ELECTRONIC TOLL COLLECTION FUNCTION

(71) Applicant: Hyundai Mobis Co., Ltd., Seoul (KR)

(72) Inventor: Eun Tai Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 114 days.

(21) Appl. No.: 17/320,037

(22) Filed: May 13, 2021

(65) Prior Publication Data

US 2021/0358229 A1    Nov. 18, 2021

(30) Foreign Application Priority Data

May 13, 2020    (KR) .................. 10-2020-0057392

(51) Int. Cl.
*G07B 15/06*    (2011.01)
*G06F 21/73*    (2013.01)

(52) U.S. Cl.
CPC ........... *G07B 15/063* (2013.01); *G06F 21/73* (2013.01)

(58) Field of Classification Search
CPC ......... B60K 28/063; B60R 1/00; B60R 1/002; B60R 1/04; B60R 1/06; B60R 1/078; B60R 1/08; B60R 1/081; B60R 1/082; B60R 1/088; B60R 1/12; B60R 1/1207; B60R 7/08; B60R 11/0247; G06F 21/73; G06K 7/0013; G07B 15/063; H01Q 1/3266
USPC ......................................................... 340/928
See application file for complete search history.

(56) References Cited

U.S. PATENT DOCUMENTS

| | | | | |
|---|---|---|---|---|
| 3,009,033 A | * | 11/1961 | Werts .................. | H01H 36/008 335/207 |
| 3,164,696 A | * | 1/1965 | Robert ................ | H01H 36/008 335/274 |
| 3,187,129 A | * | 6/1965 | McBrian ............. | H01H 36/008 335/207 |
| 3,267,302 A | * | 8/1966 | Breiner ................ | H01H 51/28 307/137 |
| 4,213,110 A | * | 7/1980 | Holce ................ | H01H 36/0026 335/207 |
| 4,943,791 A | * | 7/1990 | Holce ................ | H01H 36/0026 335/151 |
| 5,198,789 A | * | 3/1993 | Taylor ................ | H01H 50/541 335/205 |
| 5,233,323 A | * | 8/1993 | Burkett ............... | H01H 36/006 335/207 |

(Continued)

FOREIGN PATENT DOCUMENTS

| | | | | |
|---|---|---|---|---|
| CN | 206594719 U | * | 10/2017 | ............. G07B 15/06 |
| JP | H1111216 A | * | 1/1999 | ............. G07B 15/00 |

(Continued)

*Primary Examiner* — Stephen R Burgdorf
(74) *Attorney, Agent, or Firm* — DLA Piper LLP US

(57) ABSTRACT

Provided is a room mirror removal monitoring device with an electronic toll collection (ETC) function. The room mirror removal monitoring device includes a room mirror holder to which a room mirror having the ETC function is fixed and in which an insertion recess is formed toward windshield glass, a removal switch inserted into the insertion recess, a mirror base inserted into a region that does not overlap with the removal switch in the insertion recess and fixed to the windshield glass, and a monitoring part configured to monitor a removal state of the room mirror having the ETC function.

6 Claims, 9 Drawing Sheets

(56) References Cited

U.S. PATENT DOCUMENTS

| | | | | |
|---|---|---|---|---|
| 5,975,713 | A * | 11/1999 | Brothers | F21S 9/03 |
| | | | | 362/802 |
| 2003/0033867 | A1 * | 2/2003 | Posey | F16K 37/0041 |
| | | | | 137/554 |
| 2003/0117728 | A1 * | 6/2003 | Hutzel | B60R 11/0217 |
| | | | | 359/850 |
| 2006/0114086 | A1 * | 6/2006 | Grigorov | H01H 36/0026 |
| | | | | 335/151 |
| 2013/0127617 | A1 * | 5/2013 | Baade | G08B 13/06 |
| | | | | 340/539.31 |
| 2016/0377362 | A1 * | 12/2016 | Farr | F41A 17/54 |
| | | | | 42/70.06 |
| 2021/0099663 | A1 * | 4/2021 | Sloterbeek | H04N 7/18 |

FOREIGN PATENT DOCUMENTS

| | | | | |
|---|---|---|---|---|
| KR | 20100059277 A * | 6/2010 | | G06K 7/0013 |
| KR | 10-1933186 | 12/2018 | | |
| WO | WO-2019223050 A1 * | 11/2019 | | B60R 1/04 |

\* cited by examiner

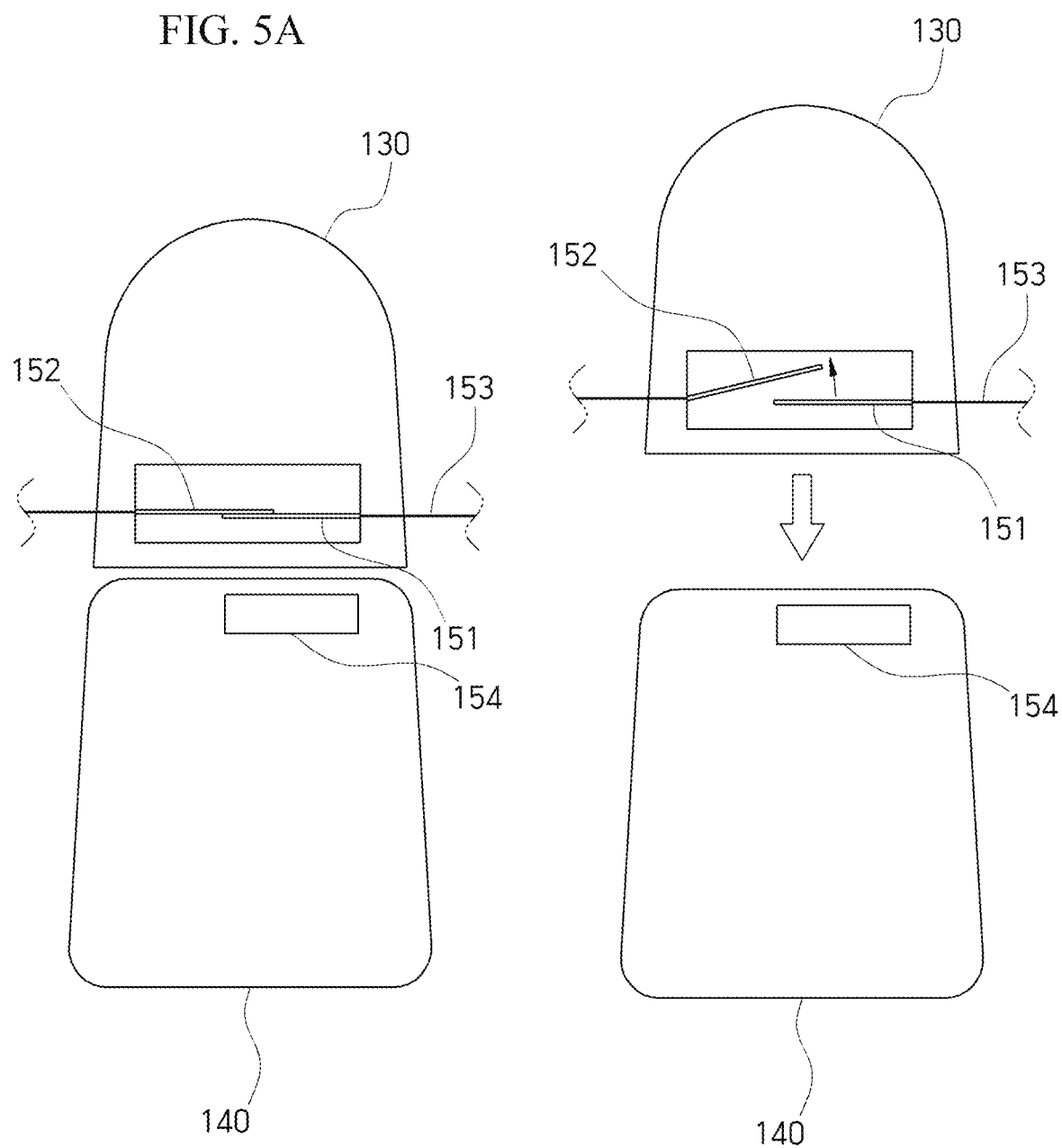

150: 151, 152, 153, 154, 156

ROOM MIRROR REMOVAL MONITORING DEVICE WITH ELECTRONIC TOLL COLLECTION FUNCTION

CROSS-REFERENCE TO RELATED APPLICATION

This application claims priority to and the benefit of Korean Patent Application No. 10-2020-0057392, filed on May 13, 2020, the disclosure of which is incorporated herein by reference in its entirety.

BACKGROUND

Field of the Invention

The present invention relates to a room mirror removal monitoring device with an electronic toll collection function, and more particularly, to a room mirror removal monitoring device with an electronic toll collection function in which a removal switch is mounted to satisfy protective dismantlement requirements defined in an electronic toll collection standard, and thus damage caused by theft and illegal use can be prevented in advance.

Discussion of Related Art

In general, an electronic payment service is a service that collects and processes a usage fee or toll using electronic money in order to solve a delay based on transportation-related fare payment, inconvenience of a user based on the transportation-related fare payment, and inefficiency of a toll collection service and may be classified into a toll electronic payment service, a public transportation fare electronic payment service, a transportation facility toll electronic payment service, and so on.

An electronic toll collection system (ETCS) is a device for providing the toll electronic payment service at, for instance, a tollgate, and includes a road side unit (RSU) installed on the tollgate and an on-board unit (OBU) mounted on a vehicle.

The OBU may be mounted on the vehicle in various types, and a room mirror type, in which the OBU is usually mounted in a room mirror and which has an ETC function, is widely used.

Usually, the room mirror having the ETC function is basically mounted on a vehicle in a vehicle producing process, and then is delivered.

This OBU may be classified into a before market-purpose OBU that is mounted and used in a vehicle in advance before the vehicle is delivered and an after market-purpose OBU that is separately bought at a market and is mounted after the vehicle is delivered.

However, in conventional Chinese ETC OBUs, an anti-removal switch is provided to only the after market-purpose OBU and is not provided to the before market-purpose OBU. Thus, development of the anti-removal switch for the before market-purpose OBU is required.

That is, to satisfy protective dismantlement requirements defined in the Chinese ETC standard, it is necessary to mount a removal switch for the purpose of preventing theft of an ETC OBU and intercept damage caused by theft and illegal use in advance. The before market-purpose OBU should be built in a room mirror, and thus there is a problem in that the mounting of the removal switch is difficult.

To solve this problem, conventionally, a separate removal switch is applied to a room mirror holder structure on which a room mirror in which an OBU is built is held, to monitor whether or not the room mirror is removed.

Specifically, the conventional room mirror holder structure is coupled with the room mirror in which the OBU is built and is fixed in a vehicle.

This room mirror holder structure is made up of a room mirror holder constituting a body, and a mirror base to which the room mirror is fixed.

In addition, a contact member that serves as a switch in contact with the mirror base is provided on the room mirror holder, and the mirror base is coupled to the room mirror holder with the contact member physically pressed in the state in which the mirror is fixed normally.

In this case, when the mirror base to which the room mirror is fixed is abnormally removed, the contact member is separated from the mirror base, and thus physical contact between the room mirror holder and the room mirror in which the OBU is built is released, by which the removal of the room mirror is monitored.

However, the contact member based on the physical contact as described above has a problem in which vibration inevitably generated during driving in view of characteristics of the vehicle is repetitively transmitted thereto, and the physical contact member is damaged.

SUMMARY OF THE INVENTION

To solve the above-mentioned problems, the present invention is directed to providing a room mirror removal monitoring device with an electronic toll collection (ETC) function, in which protective dismantlement requirements defined in the Chinese ETC standard are satisfied, and at a vehicle in which a before market-purpose on-board unit (OBU) is installed, it is possible to prevent illegal use by installing the OBU in another vehicle.

A room mirror removal monitoring device with an electronic toll collection (ETC) function according to an embodiment of the present invention includes a room mirror holder to which a room mirror having the ETC function is fixed and in which an insertion recess is formed toward windshield glass, a removal switch inserted into the insertion recess, a mirror base inserted into a region that does not overlap the removal switch in the insertion recess and fixed to the windshield glass, and a monitoring part configured to monitor a removal state of the room mirror having the ETC function.

The monitoring part may include a base segment housed in the removal switch, a movable segment housed in a region that does not overlap the base segment in the removal switch, a cable connected to the base segment and the movable segment and configured to transmit whether the base segment and the movable segment are put in a first state or a second state to an OBU printed circuit board (PCB), and a first magnetic body disposed inside the mirror base and configured to pull the movable segment toward the base segment.

The base segment and the movable segment may be formed of a metal material.

The monitoring part may be put in the first state in which the movable segment is bent toward the base segment by a magnetic force of the first magnetic body when the mirror base is disposed close to the removal switch, and the second state in which the movable segment is elastically restored to release connection with the base segment when the mirror base is removed from the room mirror holder.

The monitoring part may further include a second magnetic body disposed inside the removal switch and configured to pull the movable segment in a direction opposite to the base segment.

A magnetic force of the second magnetic body may be weaker than that of the first magnetic body.

The monitoring part may be put in the first state in which the movable segment is bent toward the base segment by a magnetic force of the first magnetic body when the mirror base is disposed close to the removal switch, and the second state in which the movable segment releases connection with the base segment while being bent in the direction opposite to the base segment by a magnetic force of the second magnetic body when the mirror base is removed from the room mirror holder.

The monitoring part may further include a contact member provided on a lower surface of the removal switch and pressed by the mirror base.

The contact member may be put in the first state in which the mirror base presses the contact member and the movable segment is bent toward the base segment by a magnetic force of the first magnetic body when the mirror base is disposed close to the removal switch, and the second state in which the pressing of the contact member is released from the mirror base and the movable segment is elastically restored to release connection with the base segment when the mirror base is removed from the room mirror holder.

The room mirror removal monitoring device with an ETC function according to the present invention has an effect that can prevent a malfunction caused by damage of a mechanical monitoring part without physical contact of a monitoring part for monitoring that a room mirror having the ETC function is removed from a vehicle.

The room mirror removal monitoring device has an effect that can reduce a manufacturing cost thereof.

The room mirror removal monitoring device has an effect that can be adjusted in various shapes and sizes according to a layout of the periphery on which the monitoring device is mounted.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 5A and 5B is a schematic view illustrating a monitoring part of the room mirror removal monitoring device with an ETC function according to an embodiment of the present invention;

FIGS. 6A and 5B is a schematic view illustrating a monitoring part of a room mirror removal monitoring device with an ETC function according to another embodiment of the present invention

DETAILED DESCRIPTION OF EXEMPLARY EMBODIMENTS

Advantages and features of the present invention and methods for achieving them will be made clear from embodiments described in detail below with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is defined by the claims. Meanwhile, terms used herein are for the purpose of describing the embodiments and are not intended to limit the present invention. As used herein, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices.

Hereinafter, exemplary embodiments of the present invention will be described in detail with reference to the accompanying drawings.

Figure 1:
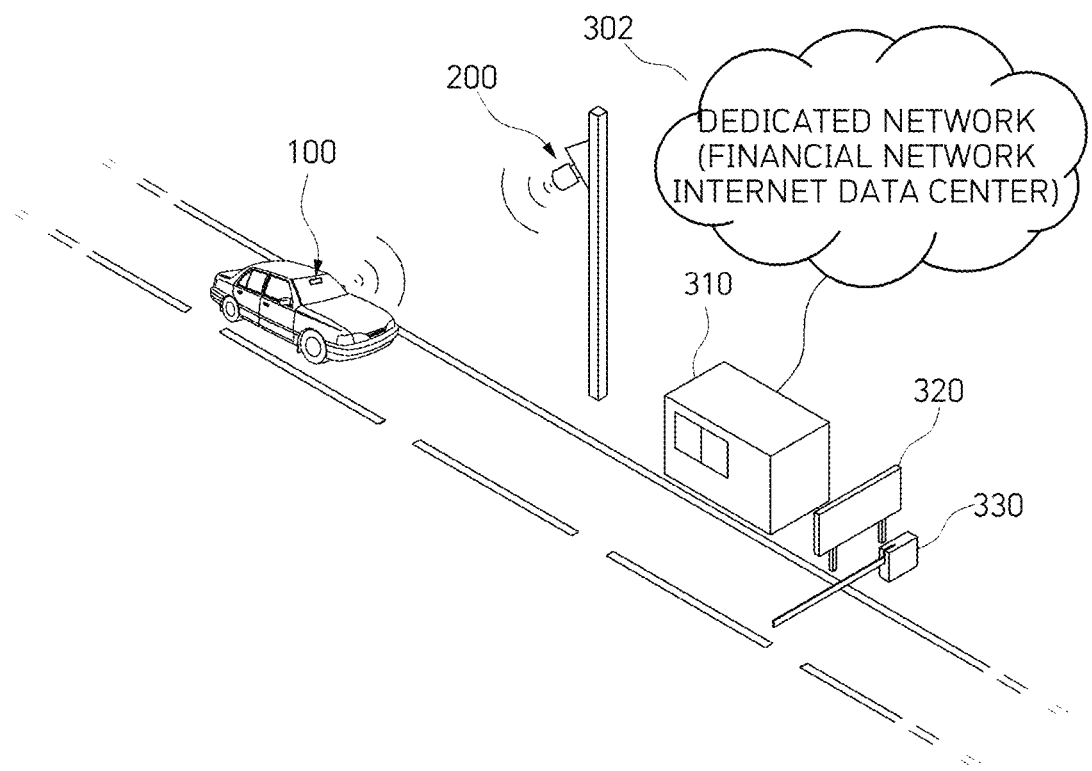
FIG. 1 is a schematic view illustrating a general electronic toll collection (ETC) system applied to the present invention.
Figure 2:
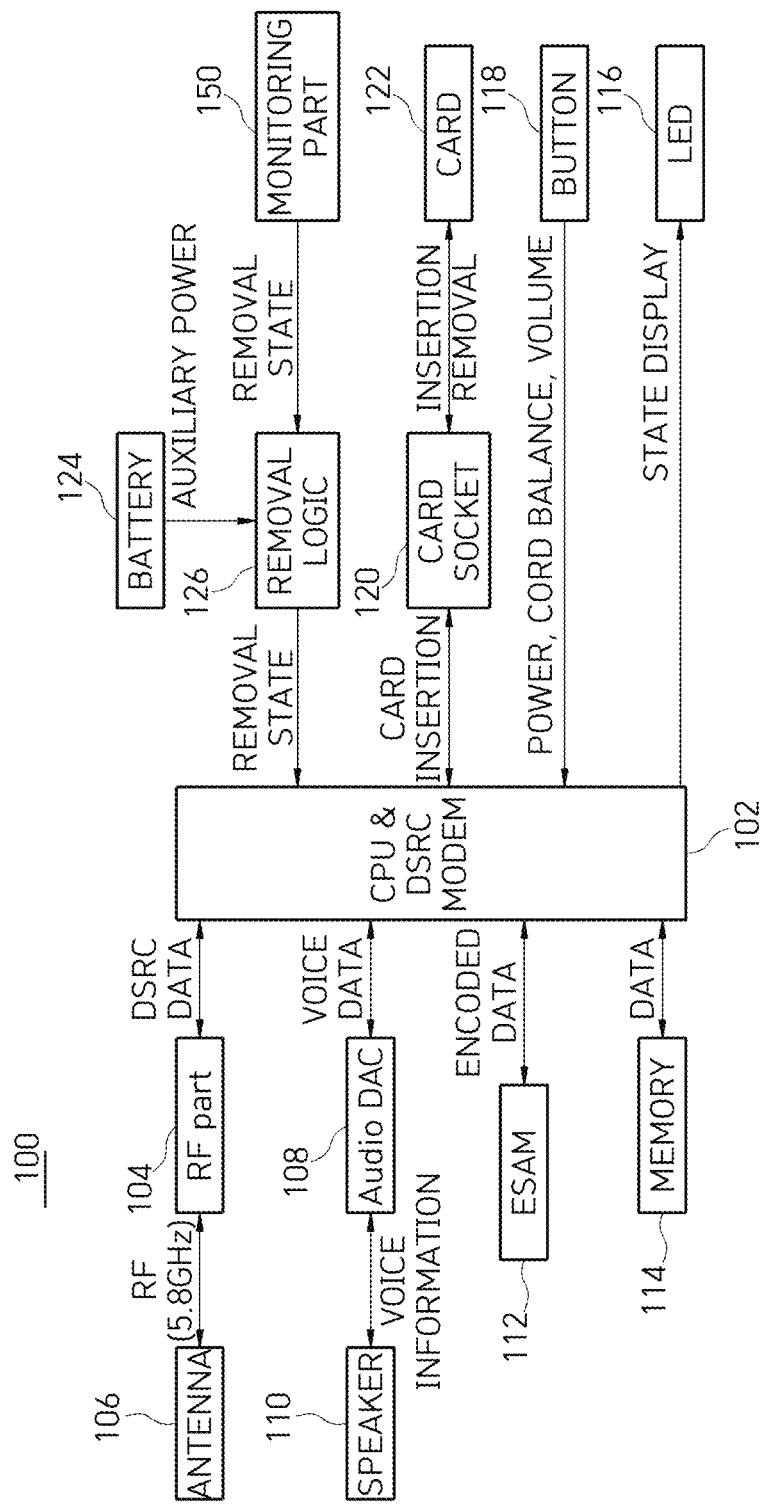
FIG. 2 is a schematic view illustrating a whole configuration of an on-board unit (OBU) to which the present invention is applied.
Figure 3:
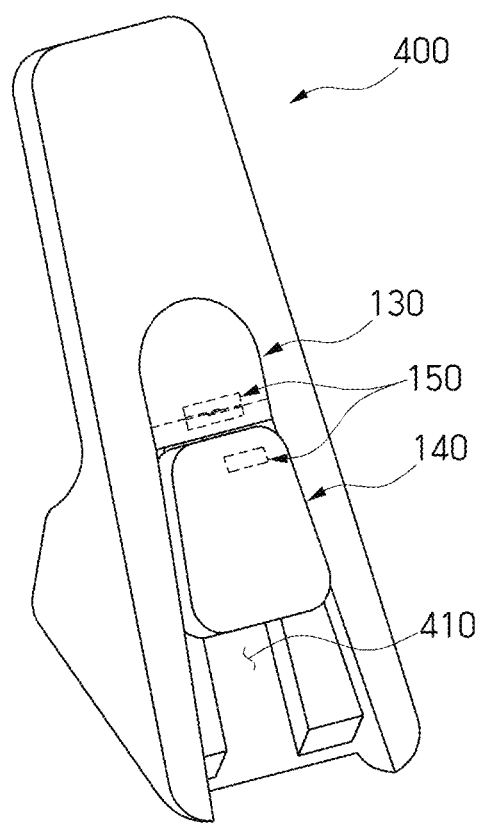
FIG. 3 is a perspective view illustrating a room mirror removal monitoring device with an ETC function according to an embodiment of the present invention.
Figure 4:
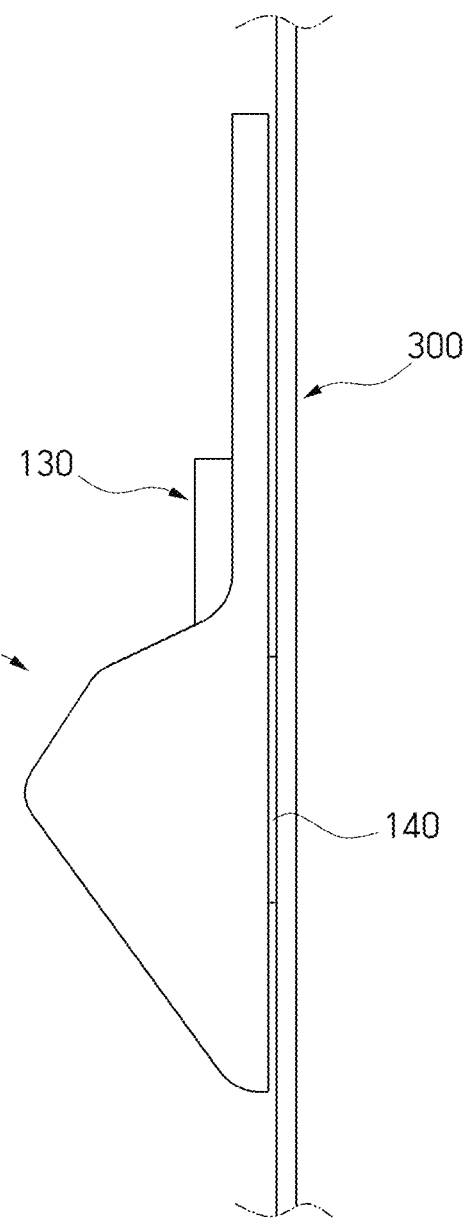
FIG. 4 is a side view illustrating a state in which a mirror base of the room mirror removal monitoring device with an ETC function according to an embodiment of the present invention is mounted on windshield glass.
Figure 6A:
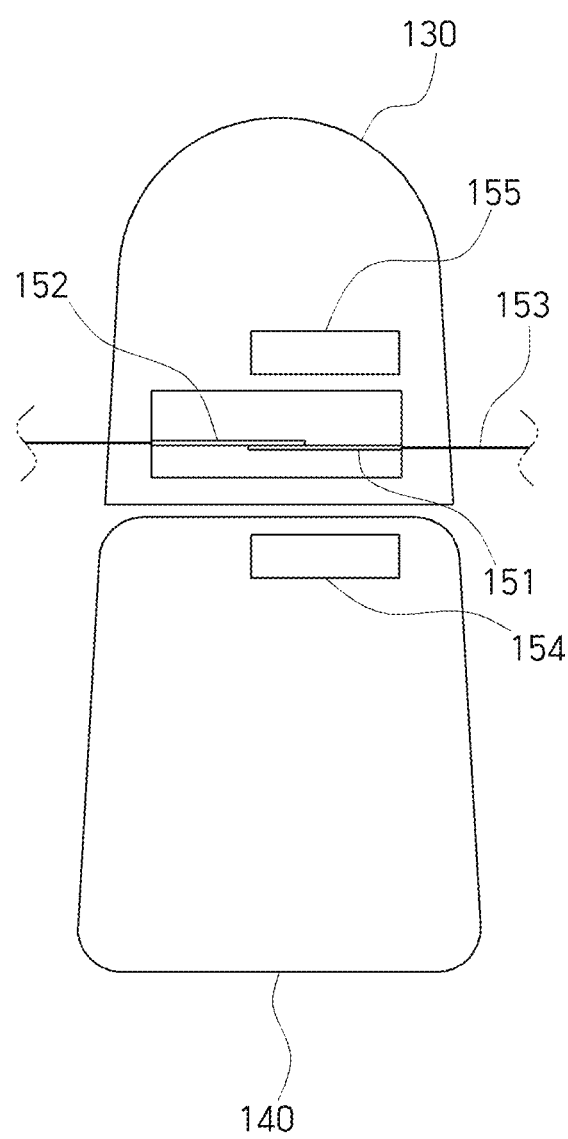
Figure 6B:
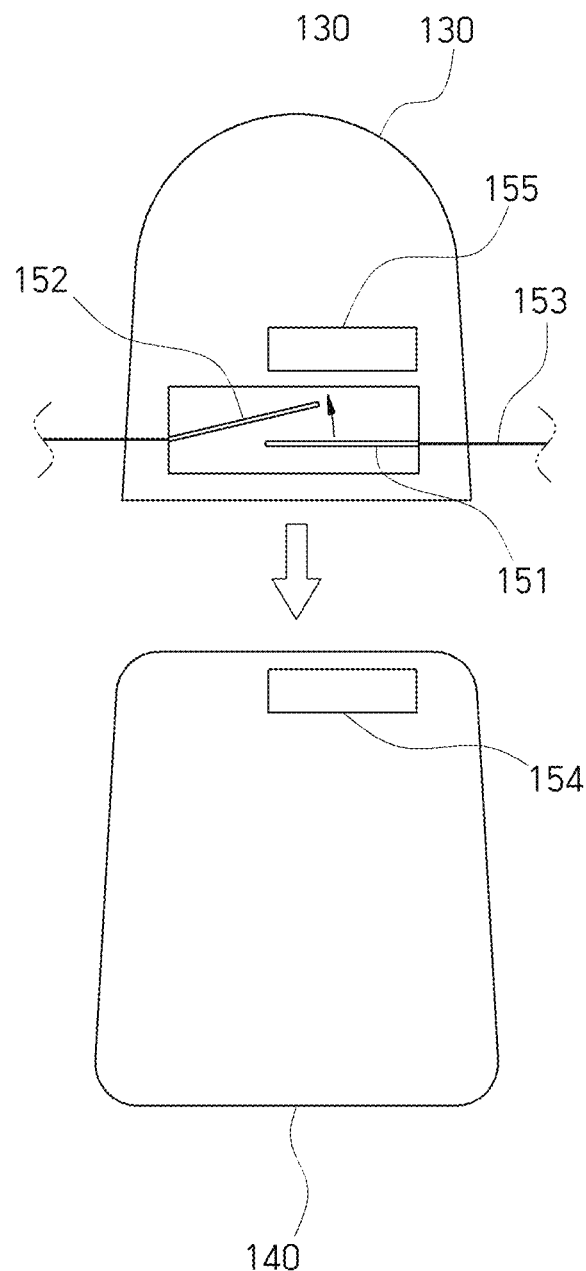
Figure 7A:
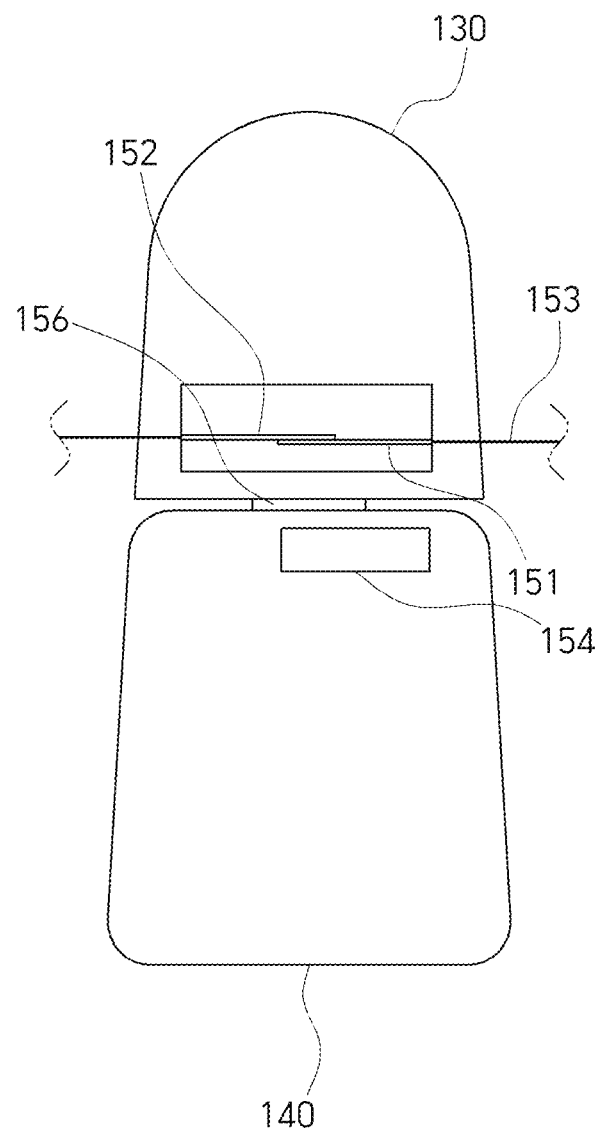
FIGS. 7A and 7B is a schematic view illustrating a monitoring part of a room mirror removal monitoring device with an ETC function according to yet another embodiment of the present invention.
Figure 7B:
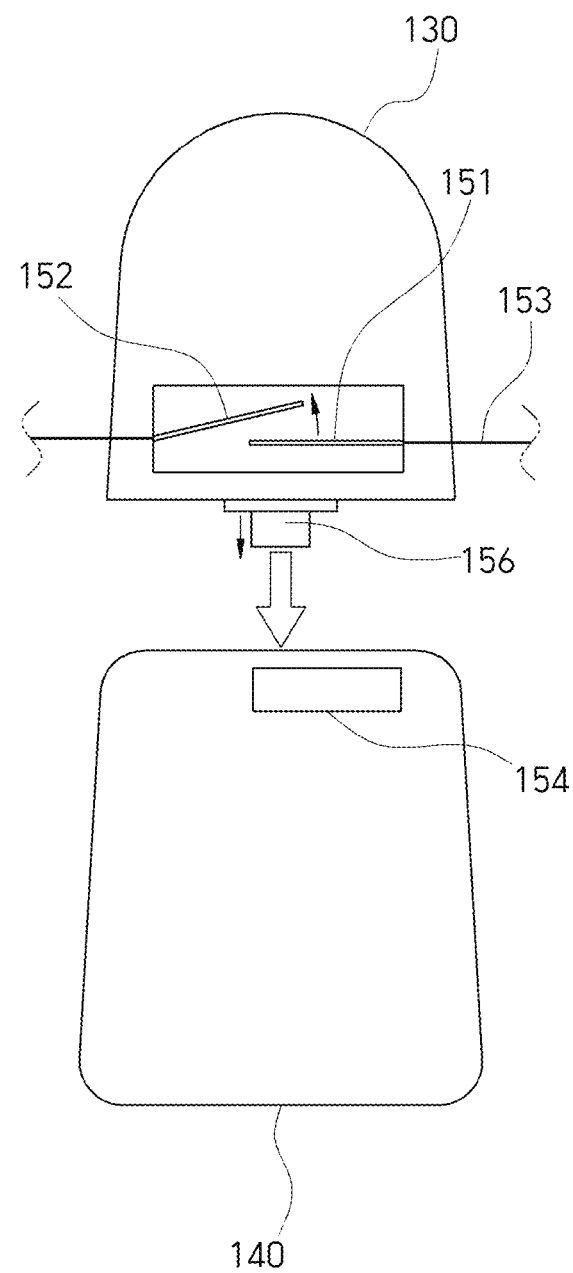

FIG. 1 is a schematic view illustrating a general ETC system applied to the present invention, FIG. 2 is a schematic view illustrating a whole configuration of an OBU to which the present invention is applied, FIG. 3 is a perspective view illustrating a room mirror removal monitoring device with an ETC function according to an embodiment of the present invention, FIG. 4 is a side view illustrating a room mirror removal monitoring device with an ETC function according to an embodiment of the present invention, FIGS. 5A and 5B is a schematic view illustrating a monitoring part of the room mirror removal monitoring device with an ETC function according to an embodiment of the present invention, FIGS. 6A and 6B is a schematic view illustrating a monitoring part of a room mirror removal monitoring device with an ETC function according to another embodiment of the present invention, and FIGS. 7A and 7B is a schematic view illustrating a monitoring part of a room mirror removal monitoring device with an ETC function according to yet another embodiment of the present invention.

FIG. 1 is a schematic view illustrating a general ETC system applied to the present invention.

As illustrated in FIG. 1, the electronic toll collection (ETC) system applied to the present invention is made up of an on-board unit (OBU) 100, a road side unit (RSU) 200 that is installed on a structure of an ETC roadway, a computer 310 that is installed in a monitoring room and is connected to a dedicated network 302, an information display 320, and a roadway boom barrier 330, and automatically collects a toll.

Referring to FIG. 1, the RSU 200 and the OBU 100 communicate with each other over a radio frequency band of 5.8 GHz band according to a DSRC communication protocol, and the computer 310 installed in the monitoring room is connected with the RSU 200 by a LAN, is connected with a financial network internet data center through the dedicated network 302, processes toll payment, displays various pieces of information on the information display 320, and controls the roadway boom barrier 330.

In this way, a communication procedure or an electronic payment procedure between the RSU 200 and the OBU 100 is processed according to prescribed ETC standard procedures, and thus a more detailed description thereof will be omitted.

FIG. 2 is a schematic view illustrating a whole configuration of an OBU to which the present invention is applied.

The OBU 100 to which the present invention is applied is a structure that is built in a room mirror of a vehicle and is made up of, as illustrated in FIG. 2, a central processing unit (CPU) & dedicated short-range communication (DSRC) modem 102, a radio frequency (RF) part 104, an antenna 106, an audio digital-to-analog converter (DAC) 108, a speaker 110, a light-emitting diode (LED) 116, a button 118, a card socket 120, a card 122, and so on.

Further, the room mirror removal monitoring device with an ETC function according to the present invention is made up of a battery 124 for supplying power for the purpose of a removal operation even in a removal state in which power of a vehicle is interrupted, a monitoring part 150 for monitoring that an ETC room mirror is removed from the vehicle, a removal logic 126 for interfacing a removal state signal of the monitoring part 150 with a CPU, an embedded security application module (ESAM) 112, and a memory 114.

Referring to FIGS. 3 to 7, a room mirror which has an ETC function and to which the present invention is applied is mounted through the room mirror removal monitoring device attached to windshield glass 300 of a vehicle, and includes a room mirror holder 400, a removal switch 130, a mirror base 140, and the monitoring part 150.

The room mirror holder 400 fixes the room mirror having the ETC function to the windshield glass 300 of the vehicle and prevents the room mirror from being removed from the vehicle.

Further, the room mirror holder 400 monitors that the room mirror having the ETC function is abnormally removed from the vehicle.

An insertion recess 410 is formed in the room mirror holder 400 in a direction in which the windshield glass 300 is disposed.

The removal switch 130 is fitted and mounted in the insertion recess 410 of the room mirror holder 400.

Some components constituting the monitoring part 150 are inserted into the removal switch 130.

In the drawings, one side of the removal switch 130 and one side of the insertion recess 410 are shown to have a round shape, but the present invention is not limited thereto, the one sides may be formed in various shapes such as a triangular shape, a quadrilateral shape, and an indefinite shape as long as the removal switch 130 can be mounted in the insertion recess 410.

The mirror base 140 is fitted and mounted in the insertion recess 410 of the room mirror holder 400 along with the removal switch 130.

When the mirror base 140 is fitted in the insertion recess 410, the mirror base 140 is fitted in a region where the mirror base 140 does not overlap the removal switch 130 and may be mounted at a position close to the removal switch 130 below the removal switch 130.

As illustrated in FIG. 4, the mirror base 140 is fixed in contact with the windshield glass 300.

Therefore, the mirror base 140 is mounted on the room mirror holder 400 in which the room mirror is held and is fixed in contact with the windshield glass 300, and thus the room mirror can be firmly fixed to the windshield glass 300.

Further, some components constituting the monitoring part 150 are inserted into the mirror base 140.

The monitoring part 150 is housed inside the removal switch 130 and the mirror base 140 and monitors the removal of the room mirror that is held on the room mirror holder 400 and has the ETC function.

The monitoring part 150 includes a base segment 151, a movable segment 152, a cable 153, and a first magnetic body 154.

The base segment 151 and the movable segment 152 are formed of a metal material and are housed inside the removal switch 130.

The base segment 151 and the movable segment 152 are formed in a shape overlapping each other, wherein the movable segment 152 is fixed to be bent inside the removal switch 130 according to a first state (a closed state) or a second state (an open state), and the base segment 151 is firmly fixed without being bent inside the removal switch 130.

That is, the movable segment 152 comes into contact with the base segment 151 while being bent toward the base segment 151 and is put in the first state (the closed state), or the movable segment 152 is elastically restored, is separated from the base segment 151, and is put in the second state (the open state).

The cable 153 is housed inside the removal switch 130 and is connected to the base segment 151 and the movable segment 152.

The cable 153 transmits a voltage or current to an OBU printed circuit board (PCB) depending on whether the state is the first state or the second state caused by the base segment 151 and the movable segment 152.

The first magnetic body 154 is housed inside the mirror base 140 so as to be close to a direction in which the removal switch 130 is disposed.

When the mirror base 140 is disposed close to the removal switch 130, the first magnetic body 154 pulls the movable segment 152, which is housed inside the removal switch 130, toward the base segment 151 using a magnetic force.

Therefore, the first magnetic body 154 pulls the movable segment 152 toward the base segment 151, and thus the movable segment 152 comes into contact with the base segment 151 while being bent toward the base segment 151, and is put in the first state (the closed state).

Specifically, when the first magnetic body 154 according to an embodiment of the present invention is mounted in the insertion recess 410 of the room mirror holder 400 in a state in which the mirror base 140 is in close contact with the removal switch 130 as illustrated in FIG. 5A, the movable segment 152 housed inside the removal switch 130 comes into contact with the base segment 151 while being bent toward the base segment 151 by a magnetic force of the first magnetic body 154 housed inside the mirror base 140, thereby maintaining the first state (the closed state).

Here, the first state is a state in which the mirror base 140 is normally mounted on the room mirror holder 400 and the room mirror having the ETC function is normally fixed to the windshield glass 300.

As illustrated in FIG. 5B, when the mirror base 140 is abnormally removed from the room mirror holder 400 on which the room mirror having the ETC function is mounted, an influence of the magnetic force of the first magnetic body 154 which reaches the movable segment 152 while the mirror base 140 moves away from the removal switch 130 becomes weak, and the movable segment 152 is elastically restored, and thus the second state (the open state) is maintained while the connection between the movable segment 152 and the base segment 151 is released.

Here, the second state is a state in which the mirror base 140 is abnormally removed from the room mirror holder 400 and the room mirror having the ETC function is removed from the windshield glass 300.

Therefore, the first magnetic body 154 monitors that the room mirror having the ETC function is removed from the vehicle in a non-contact way. Thereby, the physical contact is avoided, and a malfunction caused by physical damage to a mechanical monitoring part can be effectively prevented.

Further, as a physical monitoring part is eliminated, a manufacturing cost of the monitoring device can be reduced, and the monitoring device can be adjusted in various shapes and sizes according to a layout of the periphery on which the monitoring device is mounted.

Meanwhile, the monitoring part 150 according to an embodiment of the present invention has the first magnetic body 154 alone which is only housed inside the mirror base 140, but a monitoring part 150 according to another embodiment of the present invention is made up of a first magnetic body 154 and a second magnetic body 155.

The first magnetic body 154 is housed close to a direction in which the removal switch 130 is disposed inside the mirror base 140, and the second magnetic body 155 is disposed in a direction opposite to a direction in which the mirror base 140 is disposed inside the removal switch 130 on the basis of the base segment 151 and the movable segment 152.

When the mirror base 140 is disposed close to the removal switch 130, the first magnetic body 154 pulls the movable segment 152, which is housed inside the removal switch 130, toward the base segment 151 using a magnetic force.

Therefore, the first magnetic body 154 pulls the movable segment 152 toward the base segment 151, and thus the movable segment 152 comes into contact with the base segment 151 while being bent toward the base segment 151 and is put in the first state (the closed state).

Specifically, when the first magnetic body 154 according to another embodiment of the present invention is mounted in the insertion recess 410 of the room mirror holder 400 in a state in which the mirror base 140 is in close contact with the removal switch 130 as illustrated in FIG. 6A, the movable segment 152 housed inside the removal switch 130 comes into contact with the base segment 151 while being bent toward the base segment 151 by a magnetic force of the first magnetic body 154 housed inside the mirror base 140 and thus the first state (the closed state) is maintained.

As illustrated in FIG. 6B, when the mirror base 140 is abnormally removed from the room mirror holder 400 on which the room mirror having the ETC function is mounted, an influence of the magnetic force of the first magnetic body 154 which reaches the movable segment 152 while the mirror base 140 moves away from the removal switch 130 becomes weak, and the movable segment is bent toward the second magnetic body 155 by a magnetic force of the second magnetic body 155 that is disposed in a direction in which the mirror base 140 is disposed inside the removal switch 130 on the basis of the movable segment 152 and the base segment 151, and thus the second state (the open state) is maintained while the connection between the movable segment 152 and the base segment 151 is released.

Therefore, in the first magnetic body 154 and the second magnetic body 155 according to another embodiment of the present invention, although an elastic restoring force of the movable segment 152 is reduced, when the mirror base 140, on which the room mirror having the ETC function is mounted, is abnormally removed from the room mirror holder 400 and moves away from the removal switch 130, the movable segment 152 can release the connection from the base segment 151 due to the magnetic force of the second magnetic body 155.

Here, the magnetic force of the second magnetic body 155 may be weaker than that of the first magnetic body 154.

Therefore, when the first magnetic body 154 moves close to the movable segment 152, the movable segment 152 can easily come into contact toward the mirror base 140 in which the first magnetic body 154 is disposed because the magnetic force of the second magnetic body 155 is weaker than that of the first magnetic body 154, and can come into contact with the base segment 151.

Meanwhile, the first magnetic body 154 according to an embodiment of the present invention and the first magnetic body 154 and the second magnetic body 155 according to another embodiment of the present invention are used to monitor that the mirror base 140, on which the room mirror having the ETC function is mounted, is abnormally removed from the room mirror holder 400, but a physical contact member 156 may be simultaneously used for the monitoring part 150 according to yet another embodiment of the present invention.

The contact member 156 is provided in a structure such as a switch and is formed on a lower surface of the removal switch 130, that is, in a direction in which the mirror base 140 is disposed.

As illustrated in FIG. 7A, when the mirror base 140 is disposed close to the removal switch 130, the contact member 156 is pressed by an upper surface of the mirror base 140.

As described above, when the contact member 156 is pressed by the mirror base 140, the movable segment 152 is put in the first state (the closed state).

At the same time, the movable segment 152 housed inside the removal switch 130 comes into contact with the base segment 151 while being bent toward the base segment 151 by the magnetic force of the first magnetic body 154 housed inside the mirror base 140, and the first state (the closed state) is maintained.

As illustrated in FIG. 7B, when the mirror base 140 is abnormally removed from the room mirror holder 400 on which the room mirror having the ETC function is mounted, the pressing of the contact member 156 is released, and the movable segment 152 is put in the second state (the open state).

At the same time, an influence of the magnetic force of the first magnetic body 154 which reaches the movable segment 152 while the mirror base 140 moves away from the removal switch 130 becomes weak, and the movable segment 152 is elastically restored and thus the second state (the open state)

is maintained while the connection between the movable segment 152 and the base segment 151 is released.

Therefore, even if any one of the contact member 156 and the first magnetic body 154 is damaged, the other of the contact member 156 and the first magnetic body 154 which is not damaged is normally operated. Thereby, the monitoring part 150 according to yet another embodiment of the present invention can easily monitor that the mirror base 140 is abnormally removed from the room mirror holder 400.

Meanwhile, it is described in an embodiment of the present invention that only the first magnetic body 154 is disposed at the mirror base 140. However, as in another embodiment of the present invention, the second magnetic body 155 may be additionally disposed inside the removal switch 130 as long as the first state (the closed state) or the second state (the open state) can be monitored according to the movement of the movable segment 152.

Figure 8:
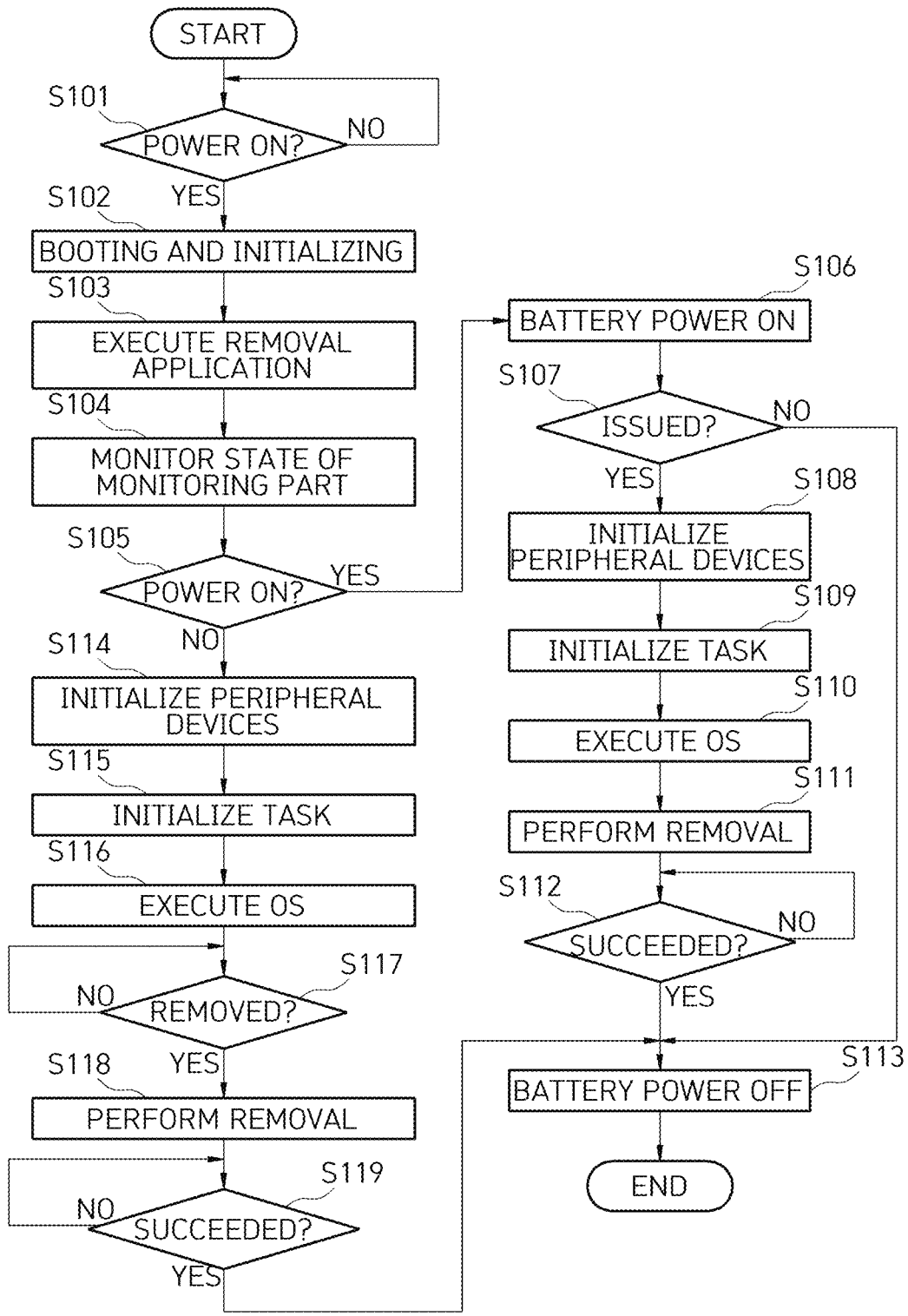
FIG. 8 is a flow chart illustrating an operation procedure of the room mirror removal monitoring device with an ETC function according to an embodiment of the present invention.

FIG. 8 is a flow chart illustrating an operation procedure of the room mirror removal monitoring device with an ETC function according to an embodiment of the present invention.

Referring to FIG. 8, when the room mirror removal monitoring device with an ETC function according to an embodiment of the present invention is powered on and is supplied with power by a battery of a vehicle or a built-in battery, the room mirror removal monitoring device enters a boot mode, performs first initialization, drives an application, initializes peripheral elements related to removal monitoring among CPU peripheral devices, and monitors a state of the monitoring part 150 (S101 to S104).

As a result of the monitoring, when the mirror base 140 is monitored as being in a removal state, the room mirror removal monitoring device is supplied with the battery power, checks whether the room mirror removal monitoring device is a normally issued OBU, and interrupts the battery power because it is unnecessary to perform the removal operation when the room mirror removal monitoring device is an OBU that is not yet issued (S105 to S107).

In the case of the normally issued OBU in operation S107, related devices for performing the removal operation are initialized and a related task and an OS are driven. Then, the ESAM 112 executes a removal command according to a prescribed procedure, and as a result of executing the removal command, a removal state is recorded on the ESAM 112 and the memory 114 (S108 to S111).

The removal operation is repeated several times when failing to perform the removal operation and the battery power is interrupted when succeeding in performing the removal operation (S112 and S113).

Meanwhile, if the mirror base 140 is in a normally mounted state in operation S105, the room mirror removal monitoring device initializes the related devices and the task and operates the OS (S114 to S116).

Afterwards, the state of the mirror base 140 is monitored through an interrupt function during the OS operation, and if the removal state is monitored, the ESAM 112 executes the removal command (S114 to S119).

Figure 9:
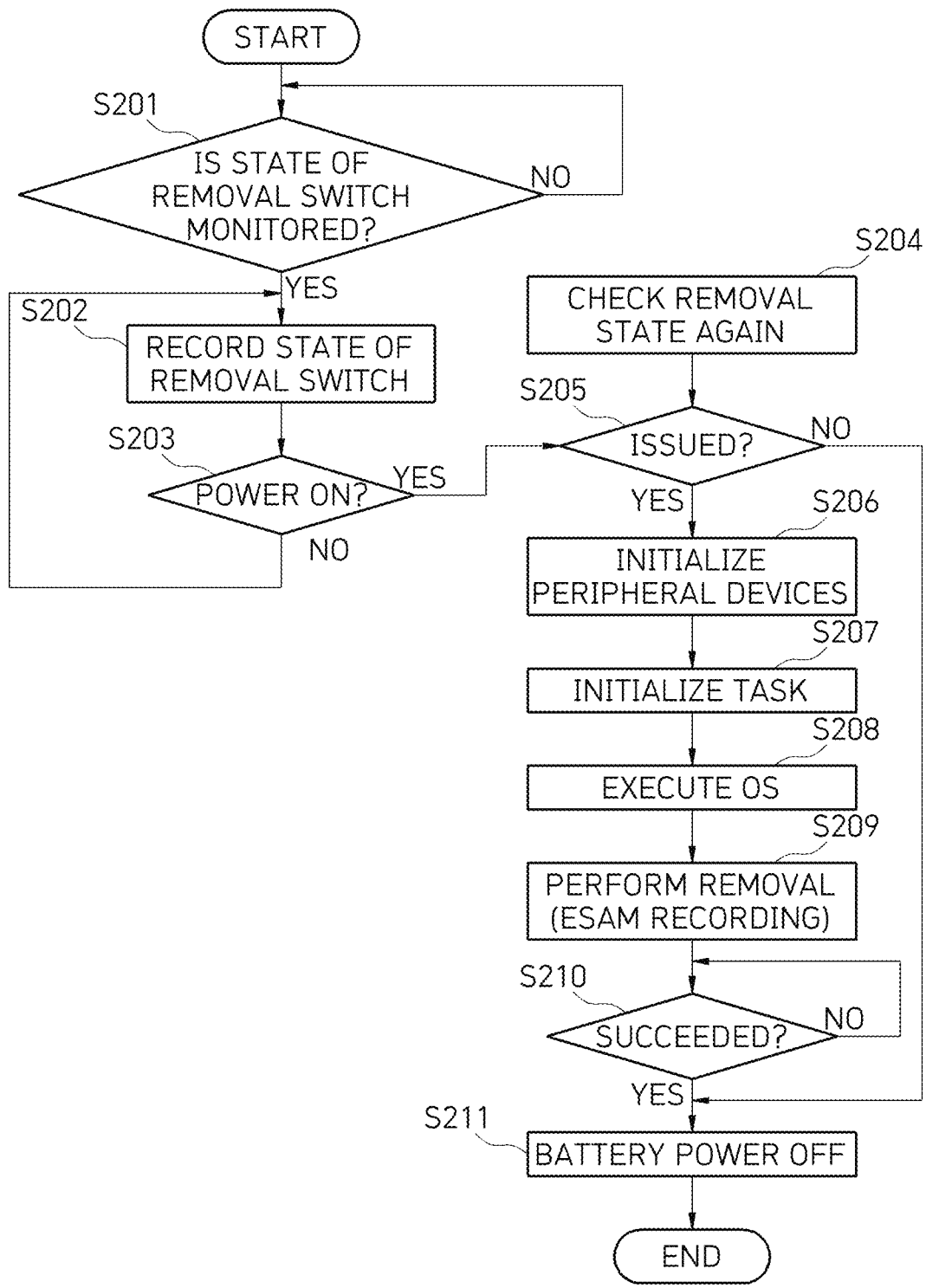
FIG. 9 is a flow chart illustrating an operation procedure of the room mirror removal monitoring device with an ETC function according to another embodiment of the present invention.

FIG. 9 is a flow chart illustrating an operation procedure of the room mirror removal monitoring device with an ETC function according to another embodiment of the present invention.

Referring to FIG. 9, first, a removal state of the removal switch 130 is monitored through power of a supercapacitor, and then the removal state of the removal switch 130 is stored in the monitoring part (S201 and S202).

Meanwhile, the supercapacitor according to another embodiment of the present invention is a capacitor that increases storage capacity in comparison with usual capacitors and reinforces performance of electric capacity. Thus, in the present invention, an ETC room mirror being removed from a vehicle can be monitored for at least 10 days or more even in a state in which a battery of the vehicle is not connected.

That is, in the present invention, it can be monitored that an ETC room mirror is removed from a vehicle while minimum power is maintained by the supercapacitor.

Next, when power is supplied by a battery or a built-in battery, the removal state of the removal switch 130 of operation S202 is checked again (S204).

Next, because it is unnecessary to perform a removal operation when the room mirror removal monitoring device is an OBU that is not yet issued, the battery power is interrupted (S205).

Next, in the case of a normally issued OBU in operation S205, related devices for performing the removal operation are initialized and a related task and an OS are driven. Then, the ESAM 112 executes a removal command according to a prescribed procedure, and as a result of executing the removal command, a removal state is recorded on the ESAM 112 and the memory 114 (S206 to S209).

The removal operation is repeated several times when failing to perform the removal operation and the battery power is interrupted when succeeding in performing the removal operation (S210 and S211).

That is, in another embodiment of the present invention, the supercapacitor is used, and thus the removal state of the removal switch 130 can be monitored before the power of the battery or the built-in battery is supplied, and thus removal of the removal switch 130 can be easily monitored while maintaining the minimum power (preventing vehicle discharge)

In this way, according to the present invention, when removal of the OBU is monitored through the removal switch 130 and the mirror base 140, the CPU and the ESAM 112 process the removal procedure using the battery power, and thus damage caused by theft or illegal use of the OBU can be prevented in advance.

The present invention has not been limited to the aforementioned embodiments and can be variously modified and carried out without departing from the technical spirit of the present invention.

What is claimed is:

1. A room mirror removal monitoring device with an electronic toll collection (ETC) function, in which an on-board unit (OBU) is built in a room mirror, the room mirror removal monitoring device comprising:
    a room mirror holder to which the room mirror having the ETC function is fixed and in which an insertion recess is formed toward windshield glass;
    a removal switch inserted into the insertion recess;
    a mirror base inserted into a first region that does not overlap the removal switch in the insertion recess and fixed to the windshield glass; and
    a monitoring part configured to monitor a removal state of the room mirror having the ETC function, wherein the monitoring part detects when the mirror base has been removed from the room mirror, wherein the monitoring part comprises:
        a base segment housed in the removal switch;
        a movable segment housed in a second region that does not overlap the base segment in the removal switch;
        a cable connected to the base segment and the movable segment and configured to transmit whether the base segment and the movable segment are put in a first state or a second state to an OBU printed circuit board (PCB);

a first magnetic body disposed inside the mirror base and configured to pull the movable segment toward the base segment;

a second magnetic body disposed inside the removal switch and configured to pull the movable segment in a direction opposite to the base segment, wherein a magnetic force of the second magnetic body is weaker than that of the first magnetic body; and a supercapacitor configured to power the monitoring part when power from a battery of a vehicle in which the monitoring part is located is unavailable;

wherein the monitoring part is configured to, in response to determining that the power from the battery of the vehicle is available, execute a check of the removal state of the room mirror.

2. The room mirror removal monitoring device of claim 1, wherein the base segment and the movable segment are formed of a metal material.

3. The room mirror removal monitoring device of claim 1, wherein the monitoring part is put in:

the first state in which the movable segment is bent toward the base segment by a magnetic force of the first magnetic body when the mirror base is disposed close to the removal switch; and the second state in which the movable segment is elastically restored to release connection with the base segment when the mirror base is removed from the room mirror holder.

4. The room mirror removal monitoring device of claim 1, wherein the monitoring part is put in:

the first state in which the movable segment is bent toward the base segment by a magnetic force of the first magnetic body when the mirror base is disposed close to the removal switch; and the second state in which the movable segment releases connection with the base segment while being bent in the direction opposite to the base segment by a magnetic force of the second magnetic body when the mirror base is removed from the room mirror holder.

5. The room mirror removal monitoring device of claim 1, wherein the monitoring part further comprises a contact member provided on a lower surface of the removal switch and pressed by the mirror base.

6. The room mirror removal monitoring device of claim 5, wherein the contact member is put in:

the first state in which the mirror base presses the contact member and the movable segment is bent toward the base segment by a magnetic force of the first magnetic body when the mirror base is disposed close to the removal switch; and the second state in which the pressing of the contact member is released from the mirror base and the movable segment is elastically restored to release connection with the base segment when the mirror base is removed from the room mirror holder.

* * * * *